United States Patent [19]
Lundström et al.

[11] Patent Number: 5,469,950
[45] Date of Patent: Nov. 28, 1995

[54] DEVICE FOR TRANSMITTING TORQUE BETWEEN TWO ROTATABLE SHAFTS

[75] Inventors: Bo Lundström, Glumslöv; Lars Severinsson, Hishult, both of Sweden

[73] Assignee: Ipumatic AB, Sweden

[21] Appl. No.: 207,156

[22] Filed: Mar. 8, 1994

[30] Foreign Application Priority Data

Mar. 15, 1993 [SE] Sweden ................... 9300838

[51] Int. Cl.⁶ .................................................. F16D 25/02
[52] U.S. Cl. ........................ 192/85; 192/103 F
[58] Field of Search ................ 475/88; 192/85 AA, 192/103 F

[56] References Cited

U.S. PATENT DOCUMENTS

| | | | |
|---|---|---|---|
| 3,987,689 | 10/1976 | Engle | 475/88 |
| 4,445,400 | 5/1984 | Sullivan et al. | 475/88 |
| 4,966,250 | 10/1990 | Imaseki | 475/88 |
| 4,997,071 | 3/1991 | Villata et al. | 192/85 AA |
| 5,046,595 | 9/1991 | Sumiyoshi et al. | 192/85 AA |
| 5,320,586 | 6/1994 | Baxter, Jr. | 475/88 |

FOREIGN PATENT DOCUMENTS 0082048  4/1986  Japan ........................ 475/88

Primary Examiner—Charles A. Marmor
Assistant Examiner—Sherry Estremsky
Attorney, Agent, or Firm—Laurence R. Brown

[57] ABSTRACT

A device for transmitting torque between two rotatable, coaxial shaft members (1, 2) in a stationary housing (4) has a clutch (11, 12) engageable to counteract differential rotational speed between the shaft members. A hydraulic clutch piston (14) is arranged to engage the clutch, and a hydraulic pump arrangement (1', 18–21, 11", 14–17), driven by the speed differential between the two shaft members, creates a hydraulic pressure on the clutch piston. The hydraulic pump arrangement includes a supply piston (18) and the clutch piston. Rollers (17, 21) are rotatable with one of the shaft members (2) and engage the other of the shaft members (1) via cams (1', 11"), which are angularly offset in relation to each other, so as to impart to the pistons a reciprocating movement at the differential rotational speed between the shaft members. A hydraulic line system (25, 27, 29, 31) connects a cylinder (23) at the supply piston on one hand with the tank (24) via a check valve (26) and on the other hand—via a line (27) with a check valve (28)—with an outlet line (31) and connects a cylinder (30) at the clutch piston (14) with the outlet line.

8 Claims, 3 Drawing Sheets

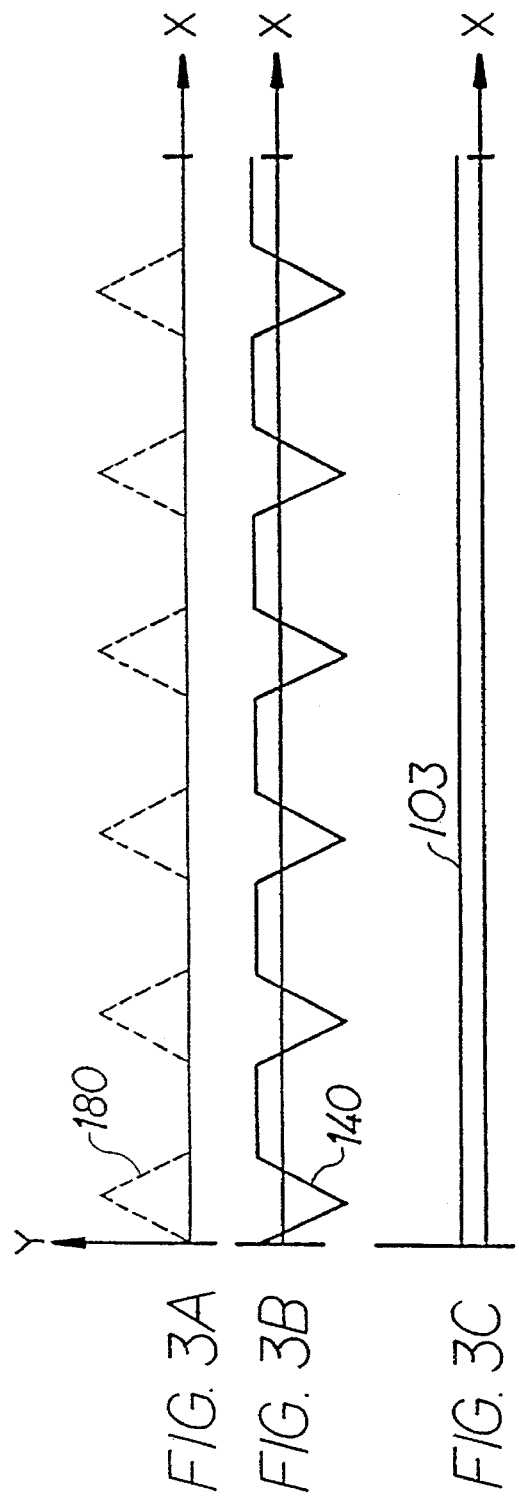
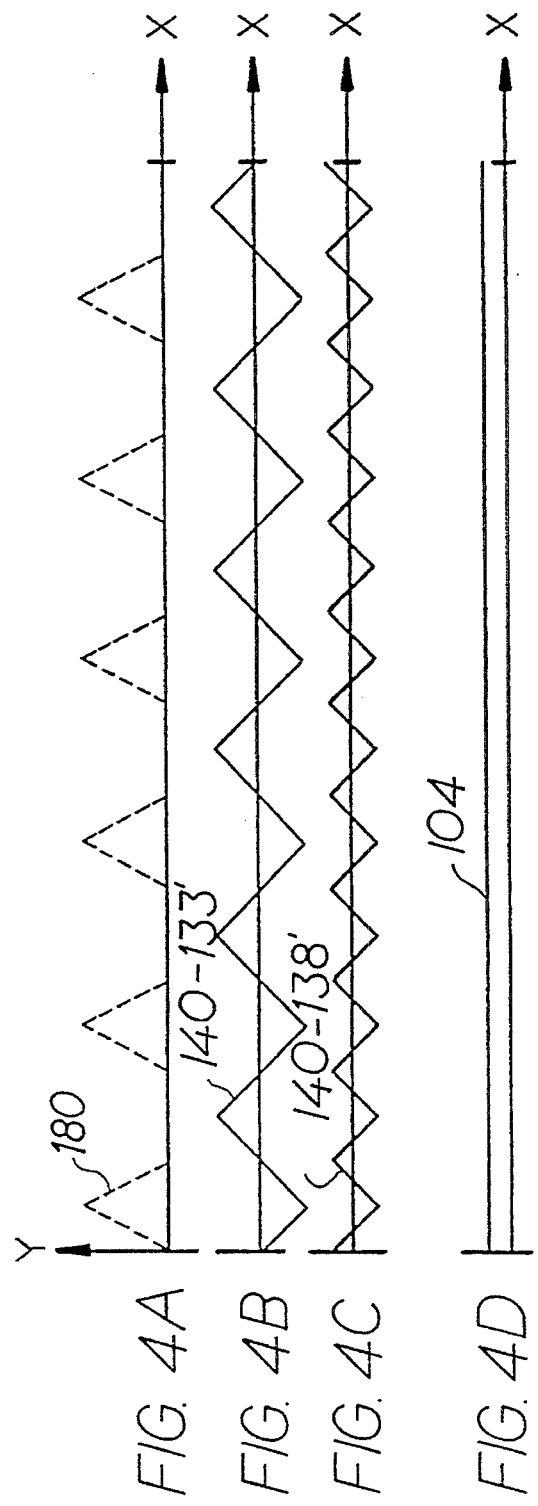

DEVICE FOR TRANSMITTING TORQUE BETWEEN TWO ROTATABLE SHAFTS

TECHNICAL FIELD

This invention relates to a device for transmitting torque between two rotatable, coaxial shaft members in a stationary housing, the device containing a number of alternate clutch discs connected to the two shaft members and engageable to counteract differential rotational speed between the shaft members, at least one hydraulic clutch piston to engage the clutch discs, and a hydraulic pump arrangement, driven by a speed differential between the two shaft members to create a hydraulic pressure on the clutch piston.

TECHNICAL BACKGROUND

Devices for transmitting torque between two rotatable shafts are known from numerous patent publications, one good example being U.S. Pat. No. 3,987,689, where the two shafts are the output shafts of a vehicle differential mechanism. The device may accordingly in this case be called a differential brake. There may, however, be other instances when it is desired to counteract a certain rotational speed differential between two shafts, a typical example being the two shafts to the driven front and rear axle, respectively, of a four-wheel-drive vehicle.

Whereas the above-mentioned patent publication shows a "speed-sensitive differential mechanism" and the present invention is applied to the more general case with two axially aligned shafts, the same general considerations apply.

Although U.S. Pat. No. 3,987,689 has been taken as an example of the prior art above, there are many other publications suggesting solutions to the problem of decreasing undesired rotational speed differential between two shafts, such as EP-Patent-0 350 044, EP-B-0 368 893, U.S. Pat. No. 4,012,968, U.S. Pat. No. 3,488,980 and U.S. Pat. No. 5,087,228.

In a copending patent application from the applicant (SE 9202200-3) a device as defined above is shown. Here the hydraulic clutch piston as well as the entire hydraulic pump arrangement are placed in the stationary housing, which gives considerable advantages. However, a possible drawback with the device shown therein is that the hydraulic flow and thus the pressure to the clutch piston from the hydraulic pump arrangement fluctuates during each operation cycle or differential rotation between the two shaft members.

The main object of the present invention is accordingly to obviate the drawback in a device with the hydraulic clutch piston and the hydraulic pump arrangement in the stationary housing that the pressure on the clutch piston fluctuates during one differential rotation between the two shaft members.

A similar object has been attained in a way which is described in GB-A-2 229 255 in a "hydraulic transmission device".

THE INVENTION

The main object of the invention, namely to obtain a pressure on the clutch piston which is even over each differential rotation, is attained in that the hydraulic pump arrangement includes a supply piston and the clutch piston, both axially moveable in the housing coaxially with the shaft members, piston actuating members rotatable with one of the shaft members and engaging the other of the shaft members via cams, which are angularly offset in relation to each other, so as to impart to the pistons a reciprocating movement at a differential rotational speed between the shaft members, and a hydraulic line system connecting a cylinder at the supply piston on one hand with a tank via a check valve and on the other hand—via a line with a check valve—with an outlet line and connecting a cylinder at the clutch piston with the outlet line.

It appears that the hydraulic pump arrangement includes two pistons, which will reciprocate by means of cams, and that one of these pistons is the clutch piston, which accordingly has the double function to be part of the hydraulic pump arrangement and to engage the clutch, when a differential speed between the two shaft members occur.

The piston actuating members are preferably rollers rotatably arranged in a radial flange of one of the shaft members and cooperating with its respective, ring shaped piston by means of a ring and an axial bearing. The rollers belonging to the supply piston cooperate with axial cams in the other one of the shaft members. A compression spring is arranged to urge the supply piston, the axial bearing, the ring, and the rollers against these cams.

In a first embodiment of the invention the rollers belonging to the clutch piston cooperate with cams on a cam ring engaging the clutch discs. The result hereof is that there will be a fixed relationship between the two sets of cams, so that the desired effect of attaining an even added flow from the two pistons will only be obtained at differential rotation in one direction.

A second embodiment may be used, if the desired effect is to be obtained at differential rotation in any direction. Here the rollers belonging to the clutch piston cooperate in order—for engaging the clutch—with primary cams on a primary cam ring, an axial bearing, a bearing ring, third rollers, which are rotatably arranged in a roller ring, and secondary cams on a secondary cam ring. In order to obtain the desired effect, the secondary cam ring is to be circumferentially displaceable. This is according to the invention obtained in that the secondary cam ring at its inner periphery is provided with protrusions, which cooperate with grooves in the other of the shaft members, each protrusion having a smaller width in the circumferential direction than its corresponding groove.

By this design the secondary cam ring will be automatically brought to either of its two positions with its protrusions against either end walls of the grooves.

THE DRAWINGS

The invention will be described further below under reference to the accompanying drawings, in which FIG. 1 is a sectional view through a first embodiment of the invention, FIG. 2 is a sectional view through a second embodiment of the invention, and FIGS. 3 and 4 are graphs to illustrate the effect of the embodiments according to FIGS. 1 and 2, respectively.

DETAILED DESCRIPTION OF PREFERRED EMBODIMENTS

Figure 1:
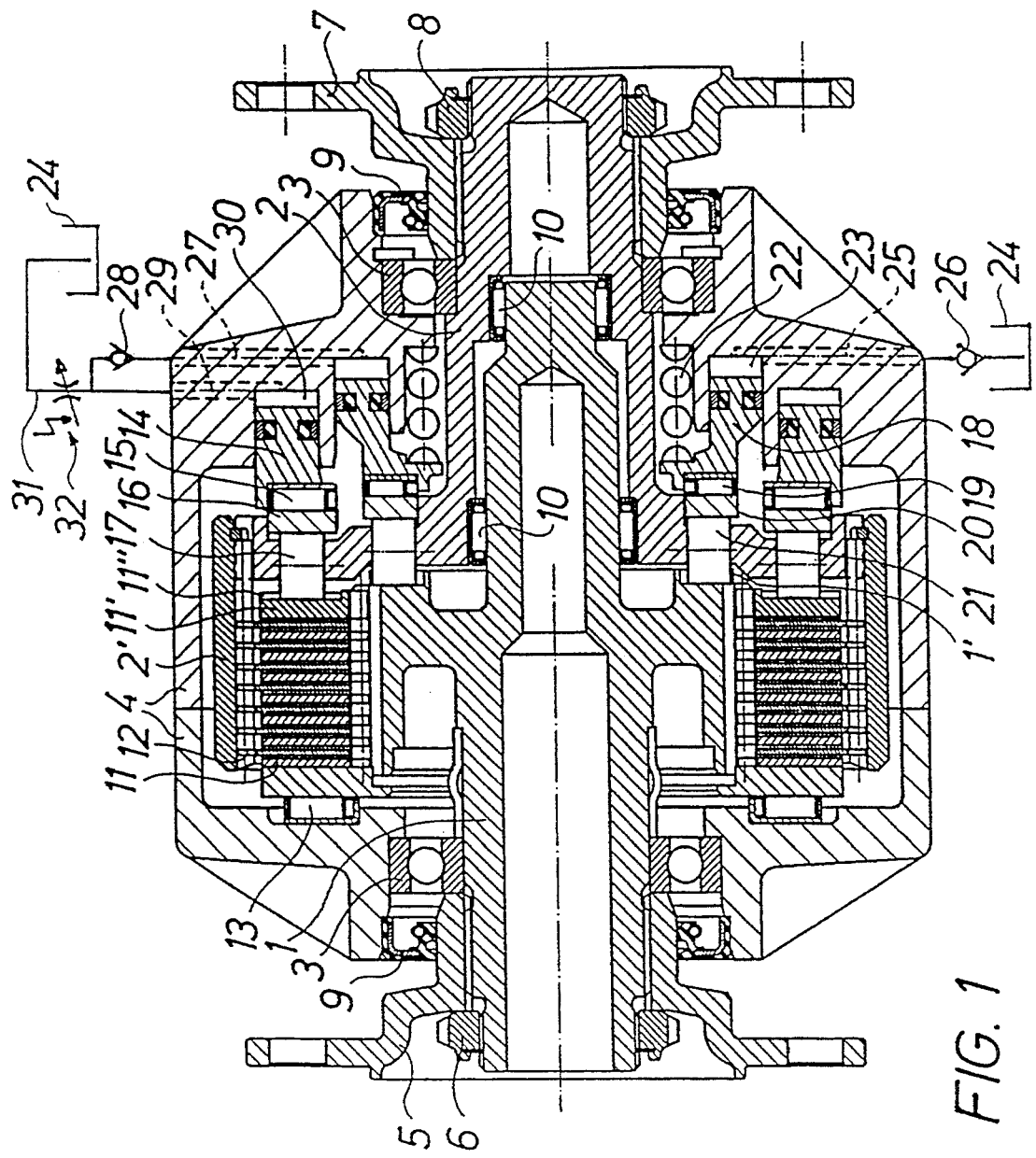

In the first embodiment shown in FIG. 1, two shaft members 1 and 2 are rotatably journalled by means of bearings 3 in a stationary housing 4. The left shaft member 1 is provided with an attachment flange 5, held in position by means of a lock nut 6. Similarly, the right shaft member 3 is provided with an attachment flange 7 and lock nut 8. Sealings 9 are provided between the housing 4 and the respective mounting flange 5 and 7.

The left shaft member 1 extends into the right shaft member 2, and radial bearings 10 are arranged between them. The arrangement is such that no relative axial movements will occur or be permitted between the two shaft members 1 and 2, which are to be connected to two shafts (not shown) by means of the attachment flanges 5 and 7.

A number of alternate clutch discs or rings 11 and 12 are splined to the left shaft member 1 and the right shaft member 2, respectively, to counteract—when engaged—differential rotational speed between the two shaft members. For constructional reasons a clutch sleeve 2' is attached as an integral part of the right shaft member 2, and the clutch discs 12 are splined to this member 2'. The stack of clutch discs will be referred to as the clutch 11, 12 below. An axial bearing 13 is arranged between the left shaft member 1 and the housing 4 at the clutch 11, 12 to transmit the reaction forces, when the clutch is engaged.

The clutch 11, 12 can be activated to clutch the two shaft members 1 and 2 together by means of a ring-shaped clutch piston 14, axially movable in and sealed relative to the housing 4. Due to the fact that this piston 14 is arranged in the stationary housing 4 and the clutch 11, 12 which it is to engage (via members to be described) is rotatable, the clutch piston 14 cooperates with an axial bearing 15. If this clutch piston 14 is pushed to the left in the drawing in a way to be described, the clutch 11, 12 will be engaged, but otherwise free relative rotation between the shaft members 2 and 3 is permitted.

The force from the clutch piston 14 and its axial bearing 15 is transmitted to the clutch 11, 12 via a ring 16, first rollers 17 and a cam ring 11' splined to the left shaft member 1 like the clutch discs 11. The cam ring 11' is on its side in engagement with the first rollers 17 provided with cams 11" in a number and for a purpose to be described. The first rollers 17—also in a number and for a purpose to be described—are rotatably arranged in a part of the right shaft member 2 formed as a radial flange.

In a similar way as the clutch piston 14, a ring-shaped supply piston 18 is axially movable in and sealed relative to the housing 4. The supply piston 18 has a smaller diameter than the clutch piston 14 and cooperates with an axial bearing 19, a ring 20 and second rollers 21, which engage the left shaft member 1. The member 1 is here provided with cams 1'—in a number and for a purpose to be described —, whereas the second rollers 21—in a number and for a purpose to be described—are rotatably arranged in the radial flange of the right shaft member 2. A compression spring 22 supported by the right shaft member 2 urges the supply piston 18 to the left in the drawing.

Hydraulic oil may be provided to a cylinder 23 at the supply piston 18 from a tank 24 through a line 25, which has a check-valve 26. For the sake of simplicity, some portions of the hydraulic system of the device are shown as being external of the device; in reality these portions are all internal. The tank 24 for example is the free volume inside the housing 4.

A line 27 extends from the cylinder 23 at the supply piston 18 and is provided with a check valve 28. It is connected to a further line 29 from a cylinder 30 at the clutch piston 14. The common line 31 after the connection of the two lines 27 and 29 is provided with a controllable restriction 32, preferably in the form of an electrically controlled throttle valve. The line 31 ends in the tank 24.

In a practical case the number of cams 11" or 1' is six and the number of rollers 17 or 21 three. Other numbers are also possible. For obtaining the desired effect, however, the number of cams 11" must be the same as the number of cams 1'. The number of rollers 17 and 21 can theoretically be the same as the number of cams but is normally a fraction thereof; in the preferred embodiment the number is three, which gives a satisfactory balancing of forces.

If the two shaft members 1 and 2 are rotating with the same speed, the rollers 17 and 21 will remain stationary relative to its cams 11" and 1' and thus not be imparted any movements in the axial direction of the device. The axial bearings 15 and 19 will allow this rotation, and no movement will be transferred to the pistons 14 and 18.

If on the other hand the two shaft members 1 and 2 rotate with different speeds, the function will be as follows: The rollers 17 and 21 will roll over the cams 11" and 1' and be imparted movements in the axial direction of the device. These movements will be transferred via the rings 16 and 20 and the axial bearings 15 and 19 to the pistons 14 and 18. The frequency of these axial movements depends on the speed differential between the two shaft members 1 and 2. As the cams 11" and 1' are circumferentially displaced in relation to each other, the result in principle is that the piston 14 moves to the right, when the piston 18 moves to the left, and vice versa. However, there is a certain overlap, as will appear below.

In a situation when the hydraulic system is filled with oil, oil will be sucked from the tank 24 past the check valve 26 into the cylinder 23, when the piston 18 moves to the left in the drawing. Concurrently herewith the piston 14 moves to the right, so that the oil in the cylinder 30 is pressed out through the line 29 past the throttle valve 32, which determines the flow and therefore secondarily influences the pressure in the cylinder 30 and the line 29. Due to the check valve 28 no oil can enter line 27.

In the next stage the piston 18 moves to the right in the drawing, pressing oil through the line 27 and past the check valve 28 but not through line 25 due to the presence of the check valve 26. When the piston 14 at the same time moves to the left, some of the oil is sucked into the cylinder 30, whereas the remainder goes out to the line 31 past the throttle valve 32.

The above course of events is graphically depicted in FIG. 3, when the number of cams 11" and 1' is six. The upper curve shows the oil flow from the piston 18, the middle curve shows the flow from the piston 14, and the lower curve the total flow at the throttle valve, which flow as seen is the desired straight line. It appears that the graph covers the events during one differential revolution, i e if the left shaft member 1 is regarded as stationary, the right shaft member 2 has made one revolution. In the graph it shall be noted that there is a certain overlap between the upper and middle curves, so that when the upper curve increases from zero, the middle curve decreases from its flat portion towards zero, whereas when the upper curve again reaches zero, the middle curve has passed zero and increased to its flat portion. If these two flows are added, the result will be the straight line of the lower curve.

The cams 11" and 1' are shaped to give the rollers 17 and 21 such movements, that the flows from the respective pistons 14 and 18 get the shapes shown in FIG. 3. The inclined lines are the result of square functional movements of the rollers 17 and 21.

The pressure in the cylinder 30 is in principle directly proportional to the rotational speed differential between the two shaft members 1 and 2, which in other words means that the resistance offered by the clutch 11, 12 (engaged by the piston 14) increases with increasing speed differential. By means of the controllable throttle valve 32 the clutch engagement can be controlled at will, which is important for example for anti-skid systems. The throttle valve 32 may be of any suitable type, but in a practical case it contains a movable valve body with a frusto-conical part cooperating with a shoulder, the position of the valve body being governed by an electrically controlled solenoid.

In the embodiment according to FIG. 1 a non-fluctuating pressure will prevail in the cylinder 30 on the clutch piston 14, provided that the differential rotation is in one direction (which of course shall be the normally occuring direction).

Figure 2:
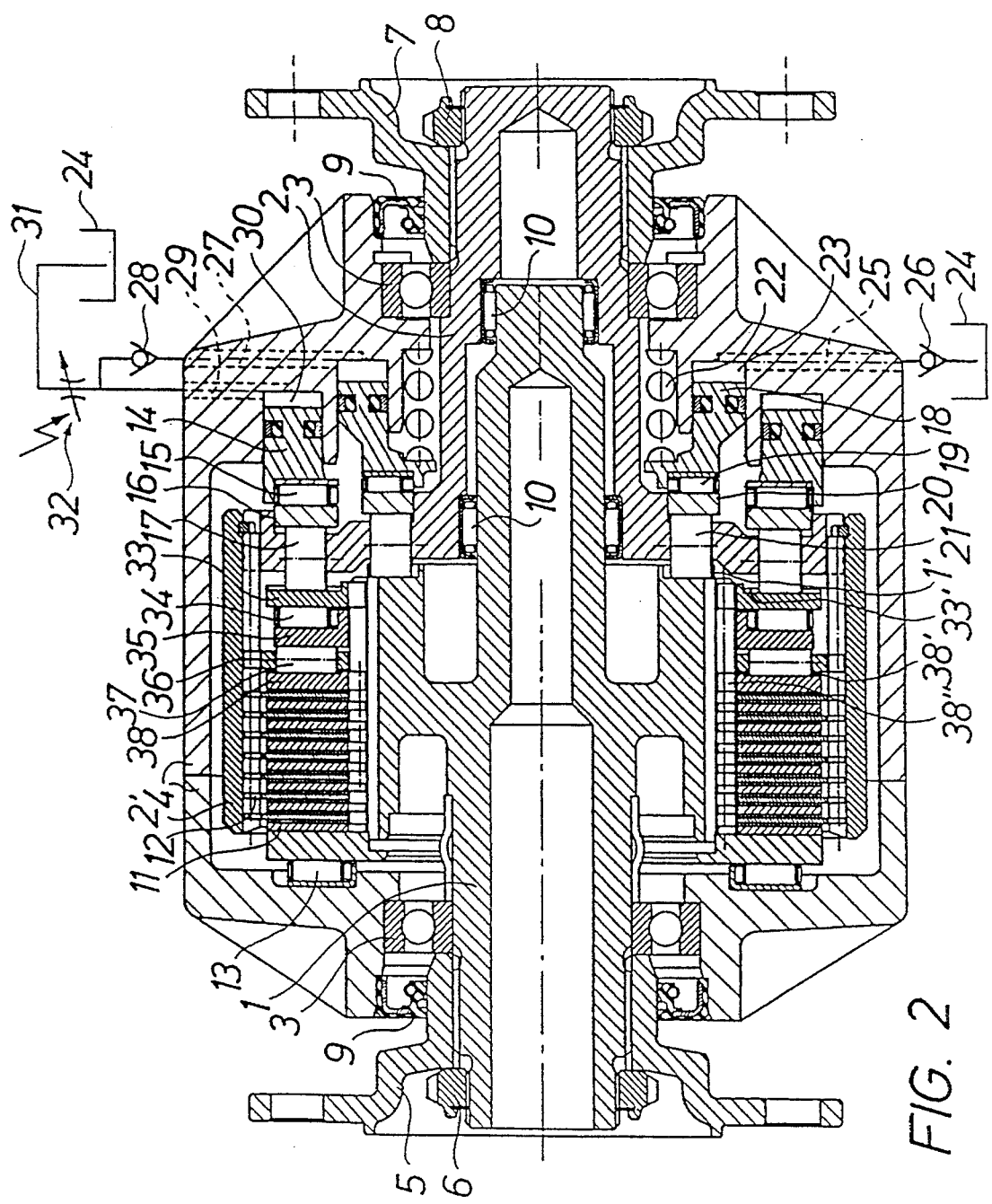

For other uses, where it shall be possible to obtain a non-fluctuating pressure on the clutch engaging piston for differential rotations in both directions, the slightly more complicated embodiment according to FIG. 2 can be employed.

The two embodiments are so close to each other in design and construction that for corresponding parts in FIGS. 1 and 2 the same numerals have been employed. Accordingly, the following parts (from the embodiment according to FIG. 1) can also be found in the FIG. 2 embodiment: a left shaft member 1 provided with cams 1', a right shaft member 2 with a clutch sleeve 2', bearings 3, a housing 4, attachment flanges 5 and 7, lock nuts 6 and 8, sealings 9, radial bearings 10, clutch discs 11 and 12 (forming a clutch 11, 12), an axial bearing 13, a clutch piston 14, an axial bearing 15, a ring 16, first rollers 17, a supply piston 18, an axial bearing 19, a ring 20, second rollers 21, a compression spring 22, a cylinder 23 (at the supply piston 18), a tank 24, a line 25, a check valve 26, a line 27, a check valve 28, a line 29, a cylinder 30 (at the clutch piston 14), and a line 31. All these parts have the same functions as in the FIG. 1 embodiment.

In the FIG. 2 embodiment the following parts for engaging the clutch 11, 12 are arranged (in order from the first rollers 17): a primary cam ring 33, an axial bearing 34, a bearing ring 35, a roller ring 36 with third rollers 37, and a secondary cam ring 38 in cooperation with the clutch 11, 12. The primary cam ring 33 and the roller ring 36 are engaged with the left shaft member 1 and the clutch sleeve 2', respectively, for rotation therewith similarly to the clutch discs 11 and 12.

At its side facing the first rollers 17 the primary cam ring 33 is provided with primary cams 33', whereas the secondary cam ring 38 at its side facing the third rollers 37 is provided with secondary cams 38'.

The primary cams 33' correspond to the cams 11" and are circumferentially displaced in relation to the cams 1'. As in the FIG. 1 embodiment the number of cams 33' and 1' is the same, for example six, with three rollers 17 and 21, respectively, for obtaining balanced forces. The number of secondary cams 38' is twice that of the primary cams 33', i e twelve in the present example. The number of third rollers 37 in the roller ring 36 may be three, six or even twelve.

By the provision of the two sets of cams 33' and 38' with their corresponding rollers 17 and 37 the piston 14 will be imparted a complex movement, being the sum of the movements caused by the respective cams, and the oil flow from the cylinder 30 will reflect this movement. In FIG. 4, which—like FIG. 3—illustrate flows as a function of the time or of the period of one differential revolution, the upper curve 180 shows the oil flow from the supply piston 18, whereas the two curves 130, 140 thereunder together illustrate the flow from the clutch piston 14: the second curve 140-133' shows the contribution from the primary cams 33' and the third curve 140-138' the contribution from the secondary cams 38'. As in FIG. 3 (103), the lower curve 104 is the addition of the curves above it and shows the total flow at the throttle valve 32. The lower curve, being a straight line, indicates that the piston 14 is exposed to a non-fluctuating pressure.

A comparison between FIG. 3 and FIG. 4 points to the fact that the shape for the cams 11" in FIG. 1 differs from that of the cams 33' in FIG. 2; in the latter case no flat portions of the flow curve are produced.

In the FIG. 1 embodiment (graphically represented in FIG. 3) the desired even oil flow and non-fluctuating pressure is created by two cams, whereas in the FIG. 2 embodiment (graphically represented in FIG. 4) three cams are needed for obtaining the same effect. The advantage with the latter embodiment is that the even oil flow and non-fluctuating, clutch-engaging pressure can be obtained irrespective of the direction of the differential rotation.

For a first direction of the differential rotation the position of the curve called 140-138' in FIG. 4 in relation to the curve 140-133' is correct for obtaining the desired even flow curve. However, in the second direction of the differential rotation the curve called 140-138' has to be phase shifted in order to get in the right position in relation to the curve 140-138' for obtaining the desired even oil flow represented by the lower curve.

This phase shift may be otained automatically in the following way: The secondary cam ring 38 is connected to the left shaft member 1 by means of protrusions 38". Due to the fact that each such protrusion 38" has a smaller width in the circumferential direction than the corresponding groove in the left shaft member 1, the secondary cam ring 38 can turn or move in the circumferential direction a distance corresponding to the desired phase shift. At rotation in one direction the secondary cam ring 38 will attain one position with its protrusions 38" against one side of the grooves in the left shaft member 1, and when the rotation direction reverses, the secondary cam ring will be turned, until its protrusions 38" engage the other side of the grooves in the left shaft member 1.

The members 17, 21, 37 have all been referred to as rollers, which is preferred, but may also be balls or similar means. Other modifications are possible within the scope of the appended claims.

What is claimed is:

1. A device for transmitting torque between two rotatable, coaxial shaft members (1, 2) in a stationary housing (4), the device containing a number of alternate clutch discs (11, 12) connected to the two shaft members and engageable to counteract differential rotational speed between the shaft members, at least one hydraulic clutch piston (14) to engage the clutch discs, and a hydraulic pump arrangement (1', 18–21, 11", 14–17; 1', 18–21, 14–17, 33–38), driven by the speed differential between the two shaft members to create a hydraulic pressure on the clutch piston, characterized in that the hydraulic pump arrangement (1', 18–21, 11', 14–17; 1', 18–21, 14–17, 33–38) is mounted on the stationary housing and includes a supply piston (18) and the clutch piston (14), both axially movable in the housing (4) coaxially with the shaft members (1, 2), piston actuating members (17, 21) rotatable with one of the shaft members (2) and engaging the other of the shaft members (1) via cams (1', 11"; 1', 33'), which are angularly offset in relation to each other, so as to impart to the pistons a reciprocating movement at a differential rotational speed between the shaft members, and a hydraulic line system (25, 27, 29, 31) connecting a cylinder (23) at the supply piston (18) on one hand with a tank (24) via a check valve (26) and on the other hand—via a line (27) with a check valve (28)—with an outlet line (31) and connecting a cylinder (30) at the clutch piston (14) with the outlet line.

2. A device for transmitting torque between two rotatable, coaxial shaft members (1, 2) in a stationary housing (4), the device containing a number of alternate clutch discs (11, 12) connected to the two shaft members and engageable to counteract differential rotational speed between the shaft members, at least one hydraulic clutch piston (14) to engage the clutch discs, and a hydraulic pump arrangement (1', 18–21, 11", 14–17; 1', 18–21, 14–17, 33–38), driven by the speed differential between the two shaft members to create a hydraulic pressure on the clutch piston, characterized in that the hydraulic pump arrangement (1', 18–21, 11", 14–17; 1', 18–21, 14–17, 33–38) includes a supply piston (18) and the clutch piston (14), both axially movable in the housing (4) coaxially with the shaft members (1, 2), piston actuating members (17, 21) rotatable with one of the shaft members (2) and engaging the other of the shaft members (1) via cams (1', 11"; 1', 33'), which are angularly offset in relation to each other, so as to impart to the pistons a reciprocating movement at a differential rotational speed between the shaft members, and a hydraulic line system (25, 27, 29, 31) connecting a cylinder (23) at the supply piston (18) on one hand with a tank (24) via a check valve (26) and on the other hand—via a line (27) with a check valve (28)—with an outlet line (31) and connecting a cylinder (30) at the clutch piston (14) with the outlet line, wherein the piston actuating members are rollers (17, 21) rotatably arranged in a radial flange of one of the shaft members (2) and cooperating with its respective, ring-shaped piston (14, 18) by means of a ring (16, 20) and an axial bearing (15, 19).

3. A device according to claim 2, characterized in that the supply piston (18) has members (21) cooperating with axial cams (1') in the other one of the shaft members (1).

4. A device according to claim 3, characterized in that a compression spring (21) is arranged to urge the supply piston (18), the axial bearing (19), the ring (20), and the rollers (21) against the cams (1').

5. A device for transmitting torque between two rotatable, coaxial shaft members (1, 2) in a stationary housing (4), the device containing a number of alternate clutch discs (11, 12) connected to the two shaft members and engageable to counteract differential rotational speed between the shaft members, at least one hydraulic clutch piston (14) to engage the clutch discs, and a hydraulic pump arrangement (1', 18–21, 11", 14–17; 1', 18–21, 14–17, 33–38), driven by the speed differential between the two shaft members to create a hydraulic pressure on the clutch piston, characterized in that the hydraulic pump arrangement (1', 18–21, 11", 14–17; 1', 18–21, 14–17, 33–38) includes a supply piston (18) and the clutch piston (14), both axially movable in the housing (4) coaxially with the shaft members (1, 2), piston actuating members (17, 21) rotatable with one of the shaft members (2) and engaging the other of the shaft members (1) via cams (1', 11"; 1', 33'), which are angularly offset in relation to each other, so as to impart to the pistons a reciprocating movement at a differential rotational speed between the shaft members, and a hydraulic line system (25, 27, 29, 31) connecting a cylinder (23) at the supply piston (18) on one hand with a tank (24) via a check valve (26) and on the other hand—via a line (27) with a check valve (28)—with an outlet line (31) and connecting a cylinder (30) at the clutch piston (14) with the outlet line, wherein the clutch piston (14) has members (17) cooperating with cams (11") on a cam ring (11') engaging the clutch discs (11, 12) (FIG. 1).

6. A device according to claim 5 characterized in that the clutch piston (14) has members (17) cooperating in order—for engaging the clutch discs (11, 12)— with primary cams (33') on a primary cam ring (33), an axial bearing (34), a bearing ring (35), third rollers (37), which are rotatably arranged in a roller ring (36), and secondary cams (38') on a secondary cam ring (38) (FIG. 2).

7. A device according to claim 6, characterized in that the secondary cam ring (38) is circumferentially displaceable.

8. A device according to claim 7, characterized in that the secondary cam ring (38) at its inner periphery is provided with protrusions (38"), which cooperate with grooves in the other of the shaft members (1), each protrusion having a smaller width in the circumferential direction than its corresponding groove.

* * * * *